US012010541B2

(12) United States Patent
Adnani

(10) Patent No.: US 12,010,541 B2
(45) Date of Patent: Jun. 11, 2024

(54) SYSTEM AND METHOD FOR CRYPTOCURRENCY INCENTIVES IN A GLOBAL DISTRIBUTED CROWDSOURCED SPECTRUM MONITORING NETWORK

(71) Applicant: ThinkRF Corporation, Kanata (CA)

(72) Inventor: Nikhil Adnani, Toronto (CA)

(73) Assignee: ThinkRF Corp., Ottawa (CA)

( * ) Notice: Subject to any disclaimer, the term of this patent is extended or adjusted under 35 U.S.C. 154(b) by 355 days.

(21) Appl. No.: 17/553,876

(22) Filed: Dec. 17, 2021

(65) Prior Publication Data

US 2022/0201525 A1 Jun. 23, 2022

Related U.S. Application Data

(60) Provisional application No. 63/127,279, filed on Dec. 18, 2020.

(51) Int. Cl.
*H04W 24/10* (2009.01)
*G06Q 30/0207* (2023.01)

(52) U.S. Cl.
CPC ........ *H04W 24/10* (2013.01); *G06Q 30/0207* (2013.01)

(58) Field of Classification Search
CPC ... H04W 24/00; H04W 24/10; G06Q 30/0207
See application file for complete search history.

(56) References Cited

U.S. PATENT DOCUMENTS

| 9,858,284 B2 * | 1/2018 | Lection | G06F 16/174 |
| 11,122,087 B2 * | 9/2021 | Gu | H04L 63/1433 |
| 2013/0212442 A1 * | 8/2013 | Patil | G06F 11/0766 |
| | | | 714/57 |

FOREIGN PATENT DOCUMENTS

CN 110601780 A * 12/2019 ........... H04B 17/382

OTHER PUBLICATIONS

Bayhan et al., Smart Contracts for Spectrum Sensing as a Service, Sep. 2019, IEEE, vol. 5, pp. 648-660 (Year: 2019).*

(Continued)

*Primary Examiner* — Raymond S Dean
(74) *Attorney, Agent, or Firm* — Stratford Group Ltd.

(57) ABSTRACT

A system and method for crowdsourcing monitoring RF spectrum in a global distributed and decentralized radio-miner system architecture is provided. A system and method comprising a cloud network comprising a plurality of clients and a plurality of radio-miners. An analog consensus mechanism that is rooted in analog capability and performance. The plurality of radio-miners demonstrating one or more technological requirements associated with one or more monitoring tasks provided by the plurality of clients. The consensus mechanism dependent on real-time analysis of over-the-air (OTA) RF signals performed by the plurality of radio-miners and the plurality of radio-miners adding to a blockchain once one or more radio parameters from the plurality of radio-miners are validated by geographically spread radio miners.

20 Claims, 3 Drawing Sheets

(56) References Cited

OTHER PUBLICATIONS

Haleem, A., Allen, A., Thompsons, A., Nijdam, M. & Garg, R. (2018). Helium A Decentralized Wireless Network. San Francisco, CA. Helium Systems, Inc. http://whitepaper.helium.com.

M.B. Weiss, K. Werbach, D.C. Sicker, C. Caicedo, On the application of blockchains to spectrum management. IEEE Trans. Cogn. Commun. Netw. (2019).

Mearian, L. (2019). FCC eyes blockchain to track, monitor growing wireless spectrums. Computerworld. https://www.computerworld.com/article/3393179/fcc-eyes-blockchain-to-track-monitor-growing-wireless-spectrums.html.

* cited by examiner

SYSTEM AND METHOD FOR CRYPTOCURRENCY INCENTIVES IN A GLOBAL DISTRIBUTED CROWDSOURCED SPECTRUM MONITORING NETWORK

FIELD OF THE INVENTION

The present disclosure relates to a crowdsourced global distributed spectrum monitoring network, more specifically but not by way of limitation, a system and method for crowdsourcing in a global distributed spectrum monitoring network. It provides a system whereby participants are incentivized to maintain and continuously improve their infrastructure of radio-miners and service spectrum monitoring requests. Incentives are by way of cryptocurrency awards.

BACKGROUND

With the rapid proliferation of wireless devices there is a growing requirement to monitor spectrum for a variety of applications—regulatory, network throughput performance, interference monitoring and surveillance.

It is getting increasingly difficult to detect and analyze such waveforms as they utilize complex modulation formats with wider bandwidths and higher operating frequencies. The geographic distribution and diversity of real-world wireless signals and unpredictability in terms of occurrence presents many challenges in terms of monitoring.

In an ideal world spectrum monitoring is a continuous operation providing real-time and proactive alerts to inform stakeholders of interference issues and network disruption for instance. However, this requires a significant geographically distributed outlay of many spectrum sensors that monitor the wireless landscape continuously. The cost of building and managing such a network is prohibitively expensive and a very complex endeavor.

Crowdsourcing and Connectivity

Crowdsourcing refers to an operational model in which individuals or organizations obtain goods and services from a large, relatively open and often rapidly evolving group of participants. With the ubiquitous nature of smartphones, such devices have become a powerful platform for crowdsourcing. For instance, companies like CarrierIQ and others have implemented crowdsourcing of network performance via participants' smartphones. These performance metrics can be used by service providers to improve the performance of their networks and identify problem spots.

The idea of crowdsourcing for IoT applications, also known as crowd connectivity, has been applied in a few different systems in the last few years. Nodle.io for instance provides a system that offloads data from IoT sensors to smartphones by way of Bluetooth connectivity. Participants in the network are incentivized by way of Nodle Cash.

Most recently Haleem et al have devised a LORA network called Helium[1] that enables crowdsourced coverage and network connectivity for IoT with distributed hotspots. Helium utilizes its own Blockchain. Miners are awarded fees based on their ability to provide network coverage and for transactions. Meanwhile devices that wish to connect to this network pay for data transfer. Proof-of-coverage is analogous to proof-of-work required in the bitcoin protocol. Helium also includes measures to prevent miners from gaming the system. Primary metrics for performance are coverage and network connectivity to send this data to and from IoT devices.

IoT devices are simple in terms of both access points and throughput requirements. Crowdsourcing is a compelling model as it places a large portion of the onus of physical hotspot procurement, installation, and management on participants.

Spectrum Monitoring

Spectrum monitoring today is a broad term that describes the practice of observing, recording, analyzing, and interpreting the radio spectrum. There are a myriad of approaches depending on the requirements and applications of the monitoring exercise. For instance, monitoring radio interference in one ISM band at 433 MHz is relatively simple when compared with spectrum monitoring by a regulator across all bands. As well, spectrum monitoring requirements vary geographically with terrain, technology implementations and other factors.

Conventional spectrum monitoring equipment and networks are owned by governments, security agencies and telecommunication network operators. For the most part, spectrum monitoring networks are owner operated. Such networks are also fragmented and lack interconnectivity. Additionally, these monitoring networks often lack intra-connectivity on account of a heterogeneous mix of vendor equipment that do not have the ability to 'talk to one another'.

There have been various attempts over the years to create geographically distributed monitoring systems that leverage crowd-sourced data. A few examples are:

The Automatic dependent surveillance-broadcast (ADS-B) network which consists of simple USB based radio receiver nodes and Raspberry Pi computers and other more sophisticated hardware.

Kiwi SDRs—a network of software-defined radios (SDRs) for high frequency (HF) monitoring.

RTL-SDRs run over a TOR network.

One common characteristic of these networks is the lack of a financial or equivalent incentive for participation. Users might participate based on personal interest and a natural curiosity. An example of this is tracking airplanes within the ADS-B system.

The main challenge in large scale adoption and deployment is around providing incentives for participants. Reliable spectrum monitoring requires radio frequency (RF) sensors everywhere—in homes, coffee shops, apartment buildings. And not just cost-effective SDRs but SDRs appropriate to the task—whatever they might cost.

Questions associated with this are: What will incentivize property owners to place these sensors on their property? What will motivate property owners to maintain and continuously improve the quality of these sensors as technology evolves? What will motivate a participant to invest in physical infrastructure, reliable connectivity and contribute to a spectrum monitoring network to provide local spectrum data?

While there has been interest in the application of blockchain and distributed ledgers for spectrum management[2][3], they do not explore the intersection of Cryptocurrency and Spectrum Monitoring.

There is a need for a crowdsourced global distributed spectrum monitoring network that incentivizes the proliferation of the global spectrum monitoring network, that is decentralized for intra-connectivity across a heterogeneous mix of vendor equipment. The most important feature of this invention is a system that awards cryptocurrency to radio-miners depending on their verified ability to conduct required spectrum monitoring activities. Three problems are being solved here:

1. It is difficult and expensive to create a global spectrum monitoring network. Hence, we are relying on crowdsourcing to create this infrastructure.
2. Verification of the capabilities of the radio-miner and also the veracity of the data produced by the radio-miner. An analog proof-of-work has been devised for this.
3. Incentivizing participants to invest in and maintain a network of radio-miners.

References: [1] Haleem, A., Allen, A., Thompsons, A., Nijdam, M. & Garg, R. (2018). Helium A Decentralized Wireless Network. San Franciso, CA Helium Systems, Inc. http://whitepaper.helium.com/
[2] M. B. Weiss, K. Werbach, D. C. Sicker, C. Caicedo, On the application of blockchains to spectrum management. IEEE Trans. Cogn. Commun. Netw. (2019)
[3] Mearian, L. (2019). FCC eyes blockchain to track, monitor growing wireless spectrums. Computerworld. https://www.computerworld.com/article/3393179/fcc-eyes-blockchain-to-track-monitor-growing-wireless-spectrums.html

BRIEF SUMMARY

It is an object of the invention to provide a system and method for crowdsourcing monitoring RF spectrum in a global distributed and decentralized radio-miner system architecture.

In accordance with an aspect of the invention, there is provided a global distributed and decentralized radio-miner system architecture for monitoring RF spectrum, comprising a cloud network comprising a plurality of clients and a plurality of radio-miners. An analog consensus mechanism that is rooted in analog capability and performance. The plurality of radio-miners demonstrating one or more technological requirements associated with one or more monitoring tasks provided by the plurality of clients. The consensus mechanism dependent on real-time analysis of over-the-air (OTA) RF signals performed by the plurality of radio-miners and the plurality of radio-miners adding to a blockchain once one or more radio parameters from the plurality of radio-miners are validated by geographically spread radio miners.

In accordance with another aspect of the invention, there is provided a method for crowdsourcing monitoring RF spectrum in a global distributed and decentralized radio-miner system architecture, comprising connecting, by a cloud network, a plurality of clients and a plurality of radio-miners. Demonstrating, by one or more from the plurality of radio-miners, one or more technological requirements associated with one or more monitoring tasks to one or more geographically spread radio miners from the plurality of radio-miners. Performing, based on an analog consensus mechanism that is rooted in analog capability and performance, real-time analysis of over-the-air (OTA) RF signals by the one or more radio-miners. Validating, by geographically spread radio miners, one or more radio parameters from the one or more radio-miners. Adding to a blockchain, by the one or more radio-miners, once the plurality of radio-miners are validated by the geographically spread radio miners and rewarding the one or more radio-miners for processing signals based on requirements from the plurality of clients.

In accordance with an embodiment of the invention, the one or more radio parameters comprise one or more of tune speed, sensitivity and dynamic range.

In accordance with an embodiment of the invention, the real-time analysis of over-the-air (OTA) RF signals is from the group comprising one or more of sensitivity, location, frequency range, GNSS coordinates, demodulation of a known pilot waveform, one or more signal transmissions from the geographically spread radio miners and validation of one or more radio-miner locations.

In accordance with an embodiment of the invention, the plurality of radio-miners are built using software-defined radio.

In accordance with an embodiment of the invention, the analog consensus mechanism is validated in the cloud or in one or more geographically spread nodes.

In accordance with an embodiment of the invention, the analog consensus mechanism is a Byzantine fault-tolerant consensus mechanism.

In accordance with an embodiment of the invention, further comprising an incentive system that rewards an ability of the plurality of radio-miners to process signals based on client requirements.

In accordance with an embodiment of the invention, the rewards are cryptocurrency.

In accordance with an embodiment of the invention, the ability of the plurality of radio-miners to process signals includes capturing and analyzing of RF spectrum.

In accordance with an embodiment of the invention, the further comprising the analog consensus mechanism utilizing measures such as correlation and comparison against known databases or validating a known beacon transmission from a node to provide a level of confidence that can be accepted or rejected.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The details of one or more embodiments of the subject matter of this specification are set forth in the accompanying drawings and the description below. Other features, aspects, and advantages of the subject matter will become apparent from the description, the drawings, and the claims.

Like reference numbers and designations in the various drawings indicate like elements.

This document provides a brief overview of a system and method for crowdsourcing in a global distributed spectrum monitoring network. The system presented hereafter, provides an incentive mechanism to participants who deploy radio-miners. Additionally, proof-of-reception provides an analog framework within which a radio-miner's ability to receive and process signals may be validated. A network of radio-miners is proposed within a cloud that validate the RF signal; the validation operation is referred to as the proof-of-reception. The validation can take place in the cloud or at individual radio-miners.

CYAN—a Network of Radio-Miners

Cyan is a global distributed and decentralized network of radio-miners that are used to monitor the RF spectrum. The monitoring operation represents the mining process in a cryptocurrency system. Radio-miners are rewarded with tokens for capture and analysis of RF spectrum.

Tokens are essentially any cryptocurrency—like Bitcoin. They can be exchanged for other cryptocurrency or currency. Cyan operates in a decentralized manner that is similar in spirit to many cryptocurrency systems like Bitcoin is Byzantine Fault Tolerant.

Cyan utilizes software-defined radio (SDR), which is a radio system where some components or building blocks that were traditionally implemented in hardware can be implemented in software instead. This simplifies reconfigurability to process a variety of waveforms. It also allows the radio system to be upgraded easily—for instance with a software update.

SDR provides the ability to upgrade detection, demodulation and analysis capabilities of radio miners with the rapid evolution of wireless waveforms. Radio-miners are built using software-defined radio and this enables ease of upgrade. Radio-miners are incentivized with Cyan Tokens to keep their radio systems current.

Figure 1:
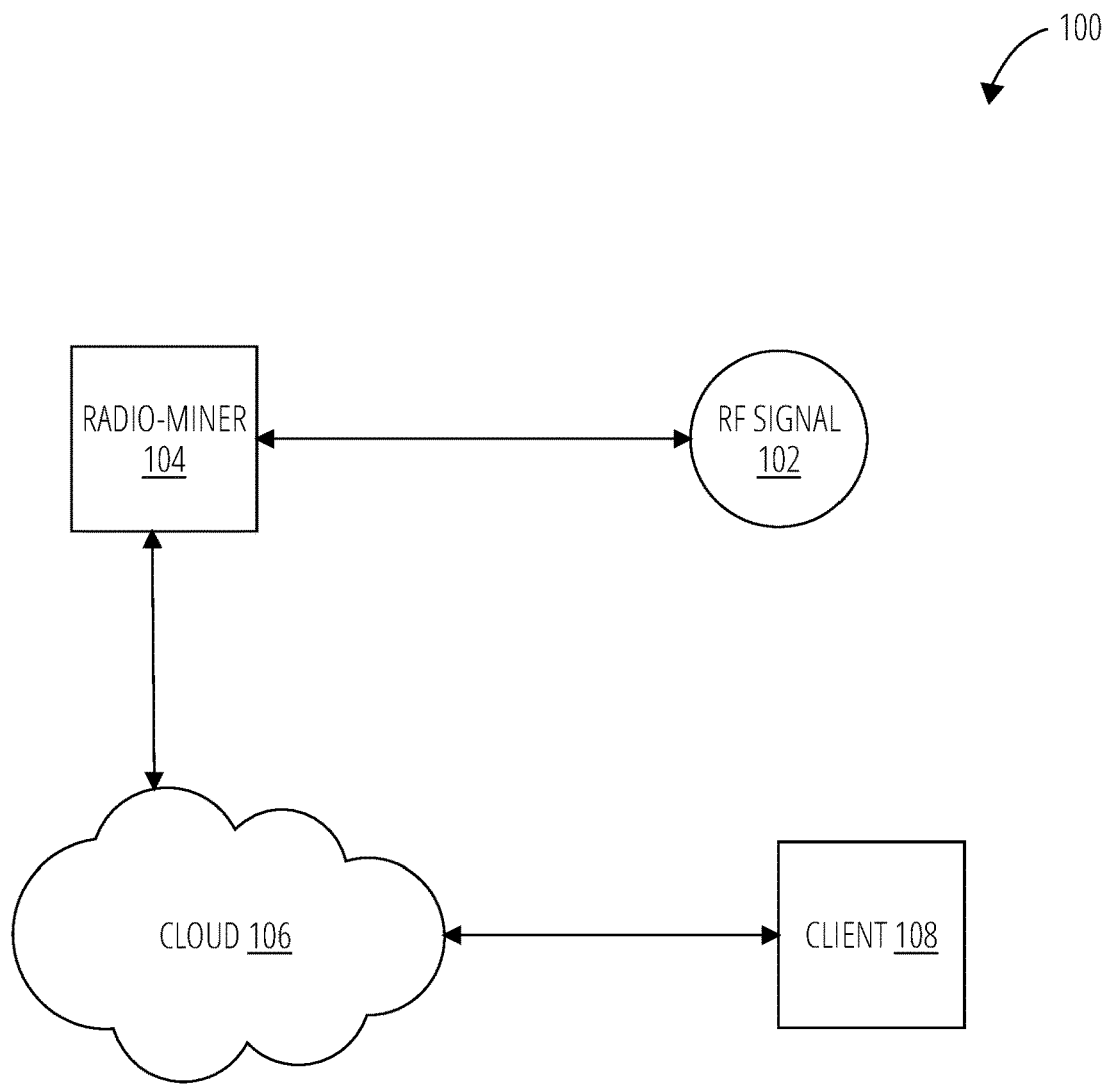
FIG. 1 illustrates an aspect of the subject matter in accordance with one embodiment.

FIG. 1 depicts a high-level system diagram 100 of a monitoring operation of the radio-miner system architecture for monitoring the RF spectrum as in one embodiment. The radio-miner system architecture is comprised of software-defined radio-miners 104. Each software-defined radio-miner 104 provides the ability to upgrade detection, demodulation and analysis capabilities of radio-miners 104 with the rapid evolution of wireless waveforms. Radio-miners 104 are incentivized by the client 108 to keep their radio systems current.

RF signal 102 parameters relevant to the client 108 request might include:
Sensitivity
Location
Frequency range
GNSS coordinates
Demodulation of a known pilot waveform
Validation of a radio-miner's 104 location Cyan leverages decentralized processing by radio-miner hardware. Data acquisition and processing might be done at the edge of the network. Although when required, analytics that requires aggregation of data from multiple radio-miners 104 will be done in the cloud 106. The analog consensus mechanism is implemented in a decentralized fashion among neighboring nodes and is rooted in analog capability and performance. Alternatively, and in some situations, it can be validated in the cloud 106.

The client 108 doesn't have visibility of the RF signal 102, the client 108 can be remote. The client 108 is looking to get the intelligence on the RF signal 102 through a network of radio-miners 104.

Figure 2:
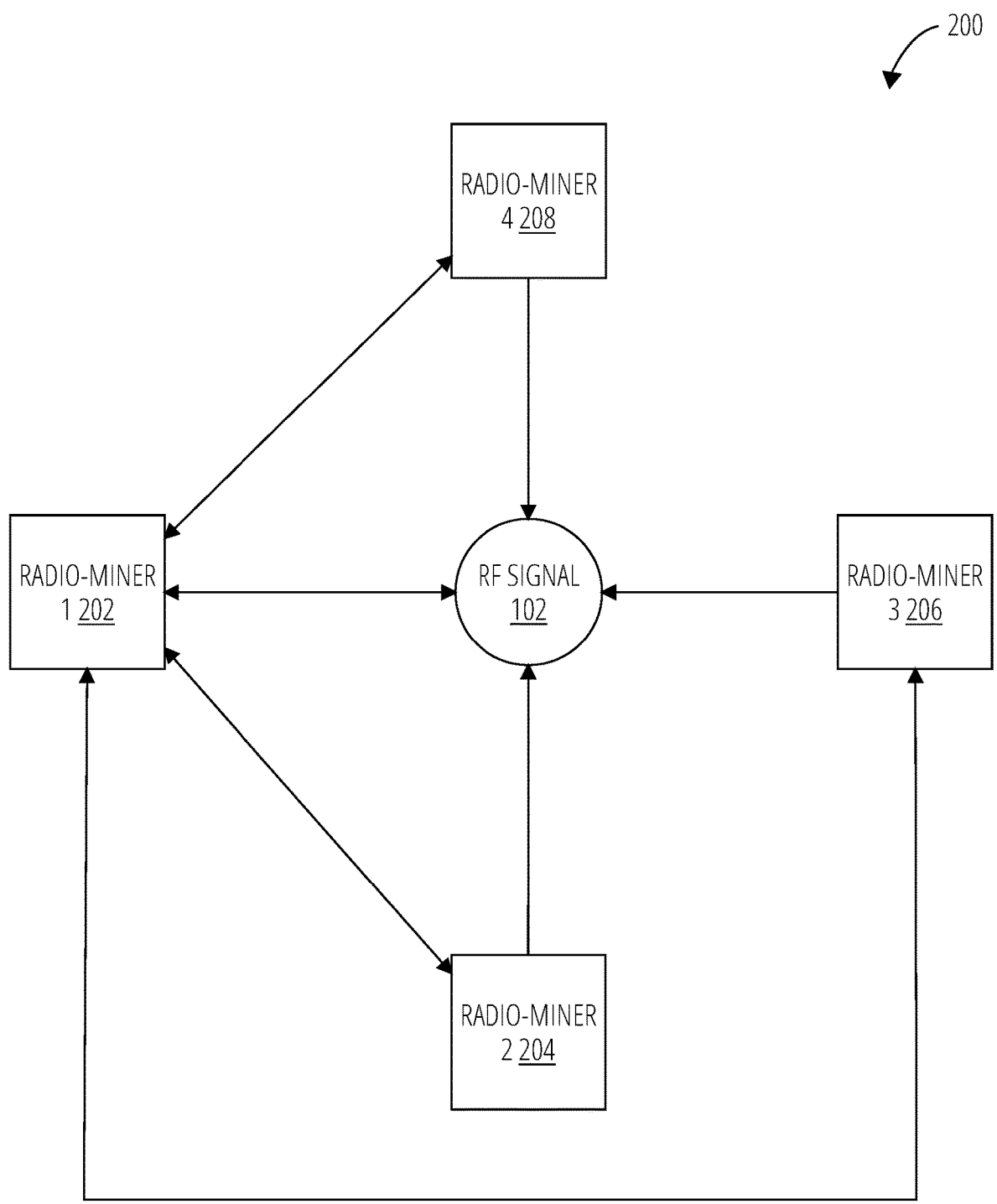
FIG. 2 illustrates an aspect of the subject matter in accordance with one embodiment.

FIG. 2 depicts a high-level system diagram 200 of a proof-of-reception of the radio-miner system architecture for monitoring the RF spectrum as in one embodiment. Proof-of-reception is a Byzantine fault-tolerant consensus mechanism that depends on real-time analysis by one or more radio-miners 104 of over-the-air (OTA) RF signals. A radio-miner 104 must demonstrate the technological requirement associated with the monitoring task. Once demonstrated as part of a proof-of-reception protocol and validated by neighboring miners, the radio-miner can add to the blockchain. In this example, radio-miner 1 202 is establishing a proof-of-reception of RF signal 102 between radio-miner 2 204, radio-miner 3 206 and radio-miner 4 208.

In a proof-of-reception challenge, radios tune within a desired frequency range and gather RF data associated with the challenge. Examples of a challenge can be reception of a known pilot signal in the area of the miners, a beacon transmission from each or any of the miners, a radio broadcast signal, etc. Various radio parameters of the radio-miner such as, but not limited to, tune speed, sensitivity, dynamic range, and other such specifications factor into whether it can solve the challenge. The results are broadcast and verified by neighboring nodes in a consensus group. The group might be able to verify one or many of the parameters.

A real-world analogy of a radio challenge is the area of radio contesting within Ham Radio where both the skill of the operator and quality of equipment play major roles.

For comparison, the consensus mechanism in Bitcoin is Proof-of-Work by which a participant essentially audits and verifies the blockchain. A participant that solves a complex mathematical puzzle is given the ability to add new transactions to the blockchain and is also rewarded with predefined units of cryptocurrency. Bitcoin mining uses a variant of the Hashcash proof-of-work function by individual miners. Each block is verified by decentralized neighboring nodes in the bitcoin network. The content of bitcoin ledgers is represented by ones and zeros. The binary nature of the content makes it easy to verify the hash function where one of the variables is the generation of the cryptographic hash value.

Measures such as correlation and comparison against known databases or individual signals provide a level of confidence that can be accepted or rejected. Unlike with Proof-of-work, proof-of-reception is easier to establish with multiple sensors in relatively close physical proximity to one another. In the absence of co-located sensors, radio parameters associated with known signals can be validated by geographically spread radio-miners 104.

The radio-miners 104 have varying levels of RF monitoring capabilities. The incentives provided by the client 108 encourage radio-miners 104 to continually upgrade their systems to obtain more coin as the processing capabilities of are highly dependent on the cost and complexity of the radio-miner itself. The radio-miners 104 may be monitoring different regions of the RF spectrum 302, overlapping regions of the RF spectrum and they may apply their individual processing capabilities accordingly.

Figure 3:
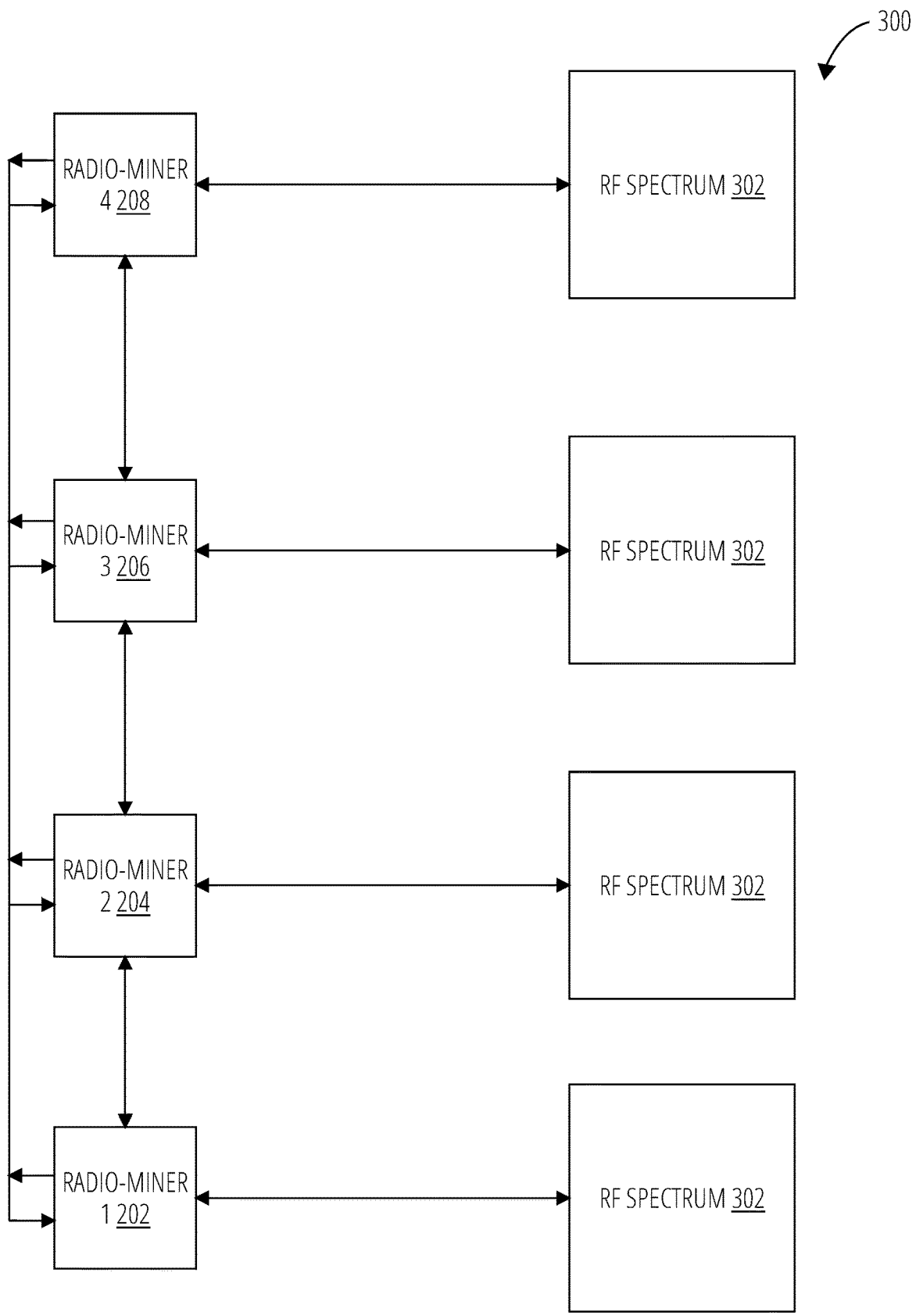
FIG. 3 illustrates an aspect of the subject matter in accordance with one embodiment.

Within the analog RF domain, it is almost impossible to validate the accuracy of RF or analog information with complete certainty on account of device and propagation physics. FIG. 3 depicts a radio-miner system architecture 300 for monitoring the RF spectrum in different geographic locations as in one embodiment. Radio-miner 1 202, radio-miner 2 204, radio-miner 3 206 and radio-miner 4 208 are shown monitoring different regions of the RF spectrum 302.

The foregoing descriptions of specific embodiments of the present invention have been presented for purposes of illustration and description. They are not intended to be exhaustive or to limit the invention and method of use to the precise forms disclosed. Obviously, many modifications and variations are possible in light of the above teaching. The embodiments described were chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient but is intended to cover the application or implementation without departing from the spirit or scope of the claims of the present invention.

What is claimed is:

1. A global distributed and decentralized radio-miner system architecture for monitoring RF spectrum, comprising:
    a cloud network comprising a plurality of clients and a plurality of radio-miners;
    an analog consensus mechanism that is rooted in analog capability and performance;
    said plurality of radio-miners demonstrating one or more technological requirements associated with one or more monitoring tasks provided by said plurality of clients;
    said consensus mechanism dependent on real-time analysis of over-the-air (OTA) RF signals performed by said plurality of radio-miners; and
    said plurality of radio-miners adding to a blockchain once one or more radio parameters from said plurality of radio-miners are validated by geographically spread radio miners.

2. The radio-miner system architecture of claim 1, wherein said one or more radio parameters comprise one or more of tune speed, sensitivity and dynamic range.

3. The radio-miner system architecture of claim 1, wherein said real-time analysis of over-the-air (OTA) RF signals is from the group comprising one or more of sensitivity, location, frequency range, GNSS coordinates, demodulation of a known pilot waveform, one or more signal transmissions from said geographically spread radio miners and validation of one or more radio-miner locations.

4. The radio-miner system architecture of claim 1, wherein said plurality of radio-miners are built using software-defined radio.

5. The radio-miner system architecture of claim 1, wherein said analog consensus mechanism is validated in said cloud or in one or more geographically spread nodes.

6. The radio-miner system architecture of claim 1, wherein said analog consensus mechanism is a Byzantine fault-tolerant consensus mechanism.

7. The radio-miner system architecture of claim 1, further comprising an incentive system that rewards an ability of said plurality of radio-miners to process signals based on client requirements.

8. The radio-miner system architecture of claim 7, wherein said rewards are cryptocurrency.

9. The radio-miner system architecture of claim 7, wherein the ability of said plurality of radio-miners to process signals includes capturing and analyzing of RF spectrum.

10. The radio-miner system architecture of claim 1, further comprising said analog consensus mechanism utilizing measures such as correlation and comparison against known databases or validating a known beacon transmission from a node to provide a level of confidence that can be accepted or rejected.

11. A method for crowdsourcing monitoring RF spectrum in a global distributed and decentralized radio-miner system architecture, comprising:
    connecting, by a cloud network, a plurality of clients and a plurality of radio-miners;
    demonstrating, by one or more from said plurality of radio-miners, one or more technological requirements associated with one or more monitoring tasks to one or more geographically spread radio miners from said plurality of radio-miners;
    performing, based on an analog consensus mechanism that is rooted in analog capability and performance, real-time analysis of over-the-air (OTA) RF signals by said one or more radio-miners;
    validating, by geographically spread radio miners, one or more radio parameters from said one or more radio-miners;
    adding to a blockchain, by said one or more radio-miners, once said plurality of radio-miners are validated by said geographically spread radio miners; and
    rewarding said one or more radio-miners for processing signals based on requirements from said plurality of clients.

12. The method of claim 11, wherein said one or more radio parameters comprise one or more of tune speed, sensitivity and dynamic range.

13. The method of claim 11, wherein said real-time analysis of over-the-air (OTA) RF signals is from the group comprising one or more of sensitivity, location, frequency range, GNSS coordinates, demodulation of a known pilot waveform, one or more signal transmissions from said geographically spread radio miners and validation of one or more radio-miner locations.

14. The method of claim 11, wherein said plurality of radio-miners are built using software-defined radio.

15. The method of claim 11, wherein said analog consensus mechanism is validated in said cloud or in one or more geographically spread nodes.

16. The method of claim 11, wherein said analog consensus mechanism is a Byzantine fault-tolerant consensus mechanism.

17. The method of claim 11, further comprising incentivizing an ability of said plurality of radio-miners to process signals based on client requirements via one or more rewards.

18. The method of claim 11, wherein said one or more rewards is a cryptocurrency.

19. The method of claim 11, wherein the ability of said plurality of radio-miners to process signals includes capturing and analyzing of RF spectrum.

20. The method of claim 11, further comprising utilizing measures, such as correlation and comparison against known databases or validating a known beacon transmission from a node to provide a level of confidence that can be accepted or rejected, via said analog consensus mechanism.

* * * * *